US010232708B2

(12) United States Patent
Burt et al.

(10) Patent No.: US 10,232,708 B2
(45) Date of Patent: Mar. 19, 2019

(54) CONTROL SYSTEM AND METHOD OF CONTROLLING A DRIVELINE

(71) Applicant: JAGUAR LAND ROVER LIMITED, Warwickshire (GB)

(72) Inventors: Sam Burt, Coventry (GB); Richard Clarke, Coventry (GB); Christopher Harries, Coventry (GB); David Sanchez, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/527,371

(22) PCT Filed: Nov. 18, 2015

(86) PCT No.: PCT/EP2015/076985
§ 371 (c)(1),
(2) Date: May 17, 2017

(87) PCT Pub. No.: WO2016/079191
PCT Pub. Date: May 26, 2016

(65) Prior Publication Data
US 2017/0326977 A1 Nov. 16, 2017

(30) Foreign Application Priority Data
Nov. 19, 2014 (GB) .................... 1420546.2

(51) Int. Cl.
*B60K 23/08* (2006.01)
*B60K 17/346* (2006.01)
(Continued)

(52) U.S. Cl.
CPC ...... *B60K 23/0808* (2013.01); *B60K 17/3465* (2013.01); *B60K 17/3515* (2013.01);
(Continued)

(58) Field of Classification Search
CPC ............ B60K 23/0808; B60K 17/3465; B60K 17/3515; B60K 2023/0858; B60K 23/08;
(Continued)

(56) References Cited

U.S. PATENT DOCUMENTS 4,613,008 A 9/1986 Hiraiwa et al.
4,630,704 A 12/1986 Yamakawa et al.
(Continued)

FOREIGN PATENT DOCUMENTS

DE 102012020906 A1 4/2014
GB 2490427 A 10/2012
(Continued)

OTHER PUBLICATIONS

Combined Search and Examination Report under Sections 17 and 18(3) for Application No. GB1420546.2 dated May 3, 2016.
(Continued)

*Primary Examiner* — Jacob S. Scott
*Assistant Examiner* — Tinh Dang
(74) *Attorney, Agent, or Firm* — Carlson, Gaskey & Olds

(57) ABSTRACT

Some embodiments of the present invention provide a control system configured to control a driveline of a motor vehicle to operate in a selected one of a plurality of configurations, the system comprising at least one sensor for sensing an environment ahead of the vehicle and generating a sensor signal in dependence on the environment, the system being configured to cause the driveline to operate in a configuration selected in dependence at least in part on the sensor signal.

20 Claims, 5 Drawing Sheets

(51) Int. Cl.
  *B60K 17/35* (2006.01)
  *B60W 10/119* (2012.01)
  *B60W 10/02* (2006.01)
  *B60W 40/06* (2012.01)

(52) U.S. Cl.
  CPC ........... *B60K 23/08* (2013.01); *B60W 10/119* (2013.01); *B60W 40/06* (2013.01); *B60K 2023/0858* (2013.01); *B60W 10/023* (2013.01)

(58) Field of Classification Search
  CPC ... B60W 10/023; B60W 10/119; B60W 40/06
  See application file for complete search history.

(56) References Cited

U.S. PATENT DOCUMENTS

| | | | | |
|---|---|---|---|---|
| 4,712,635 | A * | 12/1987 | Sumiya | B60K 23/08 |
| | | | | 180/197 |
| 9,481,243 | B2 * | 11/2016 | Larkin | B60K 23/08 |
| 2005/0004732 | A1 * | 1/2005 | Berry | B60W 10/06 |
| | | | | 701/48 |
| 2010/0017083 | A1 | 1/2010 | Zalewski et al. | |
| 2012/0095659 | A1 * | 4/2012 | Rodrigues | B60K 23/08 |
| | | | | 701/69 |
| 2014/0067217 | A1 | 3/2014 | Stares | |
| 2015/0210290 | A1 * | 7/2015 | Hemes | B60W 50/082 |
| | | | | 701/36 |

FOREIGN PATENT DOCUMENTS

| | | |
|---|---|---|
| JP | 2014129746 A | 7/2014 |
| WO | 2014/104254 A1 | 7/2014 |

OTHER PUBLICATIONS

International Search Report and Written Opinion of the International Searching Authority for International application No. PCT/EP2015/076985 dated Mar. 7, 2016.

Combined Search and Examination Report under Sections 17 and 18(3) for Application No.

* cited by examiner

CONTROL SYSTEM AND METHOD OF CONTROLLING A DRIVELINE

INCORPORATION BY REFERENCE

The entire contents of co-pending UK patent application GB1202427.9 (publication number GB2499252), UK patents GB2325716, GB2308415, GB2341430, GB2382158, GB2492748, GB2492655 and GB2381597 and US2003/0200016 are expressly incorporated herein by reference.

FIELD OF THE INVENTION

The present disclosure relates to a control system and a method of controlling a driveline, for example a motor vehicle driveline. In particular, but not exclusively, aspects of the invention relate to drivelines of motor vehicle such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Each pair of wheels may be considered to form part of an axle, the vehicle having a front axle and a rear axle. Motive power is supplied to the wheels by means of a driveline.

Some known vehicles are arranged such that motive power is permanently supplied to both axles. Some other vehicles are arranged such that motive power is selectively supplied to either only one axle or to both axles. A driver operable selector may be provided to allow the driver to select two wheel (single axle) and four wheel (two axle) operation.

Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of the wheels of one axle to the driveline following disconnection of the wheels of that axle may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline from two of the wheels when a prescribed condition is met so that the vehicle operates in a two wheel drive mode. The system automatically reconnects the driveline to enable four wheel drive operation when the prescribed condition is not met.

It is an aim of embodiments of the present invention to at least partially mitigate the disadvantages of known dynamic driveline systems.

STATEMENT OF THE INVENTION

Aspects and embodiments of the invention may be understood by reference to the appended claims.

Aspects of the invention provide a control system, a driveline, a powertrain, a motor vehicle, a method, a carrier medium, a computer program product, a computer readable medium and a processor.

In one aspect of the invention for which protection is sought there is provided a control system configured to control a driveline of a motor vehicle to operate in a selected one of a plurality of configurations,
the system comprising at least one sensor for sensing an environment ahead of the vehicle and generating a sensor signal in dependence on the environment,
the system being configured to cause the driveline to operate in a configuration selected in dependence at least in part on the sensor signal.

Embodiments of the present invention have the advantage that a configuration in which a driveline operates may be controlled in a pre-emptive manner. Thus, the driveline may be placed in a predetermined configuration in response to a signal from the at least one sensor before the vehicle negotiates the terrain ahead of the vehicle. By controlling driveline configuration pre-emptively, excessive wear of one or more components of the driveline such as one or more clutches due to the driveline attempting to assume the predetermined configuration whilst the vehicle is actually negotiating the terrain (such as an inclined slope where excessive slip may be experienced) may be reduced. This is because the clutches can close, or be caused to increase the amount of locking torque provided, before an increase in speed between input and output portions of the clutch occurs due to wheel slip, thereby reducing wear and/or thermal loading of the clutches. It is to be understood that pre-emptive control of a driveline can improve vehicle stability by placing the driveline in a state in which it is preferable to operate in a given situation before the situation is encountered. This feature can enhance vehicle stability when the situation is first encountered.

The system may be configured to generate data indicative of at least one characteristic of the environment in response to a signal generated by the at least one sensor, and to cause the driveline to operate in a configuration selected in dependence at least in part on the data indicative of the at least one characteristic of the environment ahead of the vehicle.

Furthermore, reducing wheel slip can reduce wear of one or more other components such as tyres of the vehicle, and reduce degradation of a driving surface over which the vehicle is driving.

The control system may comprise one or more electronic controllers.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements may be useful in some embodiments.

The control system may be configured to cause the driveline to operate in a first configuration in which the driveline is configured such that a first group of one or more wheels and in addition a second group of one or more wheels are arranged to be driven or a second configuration in which the first group of one or more wheels and not the second group are arranged to be driven.

The vehicle may have a driveline arranged to drive two groups each of two wheels, the first configuration corresponding to a four wheel drive mode of operation and the second configuration corresponding to a two wheel drive mode of operation.

The driveline may be configured to assume the first or second configuration in dependence at least in part on the sensor signal.

It is to be understood that, if the vehicle is operating in the second configuration and the system determines that the environment ahead of the vehicle warrants operation in the first configuration, the system may cause the driveline to assume the first configuration. For example, if a ramp or slope ahead of the vehicle is detected having a gradient exceeding a predetermined value, which value may optionally be determined in dependence on at least one parameter indicative of surface coefficient of friction between a wheel of the vehicle and the driving surface, the system may cause the driveline to assume the first configuration so as to enhance vehicle composure as the vehicle negotiates the ramp or slope.

The first or second group of one or more wheels may comprise a plurality of wheels, the driveline being operable in a configuration in which a predetermined amount of locking torque is established between at least a pair of wheels of the plurality of wheels of the first or second group in dependence at least in part on the sensor signal.

The predetermined amount of locking torque may be substantially a fixed amount of locking torque, for example a maximum amount that may be developed. By locking torque is meant the difference in the amount of torque that must be applied between at least a pair of wheels in order to cause relative rotation of the wheels. The locking torque may be a cross-axle locking torque between wheels of a given axle. Alternatively the locking torque may be an inter-axle locking torque between wheels of respective axles.

The control system may be configured to set a predetermined amount of locking torque between at least one wheel of the first group and at least one wheel of the second group in dependence at least in part on the sensor signal.

Locking torque may be established between wheels of different axles for example by locking a centre differential, being a differential gear arrangement that is configured to allow torque coupling between wheels of respective different axles, but to allow the wheels of the respective axles to rotate at different speeds when required. Rotation at different speeds may occur for example when wheels of one axle being driven by the powertrain experience greater slip than wheels of another axle that is being driven by the powertrain.

The control system may be configured to estimate a gradient of a driving surface in dependence on the at least one sensor signal, the system being configured to cause the driveline to operate in a configuration selected in dependence at least in part on the estimated gradient.

The control system may be configured to cause the driveline to operate in a configuration selected in further dependence at least in part on at least one characteristic of a driving surface.

The control system may be configured to determine the at least one characteristic at least in part by reference to one selected from amongst a signal generated by a rain sensor, a signal indicative that the vehicle is wading, and data received by the system from a weather data service.

It is to be understood that the signal indicative that the vehicle is wading may be generated by user selection of a wading mode of vehicle operation, where present, or detection that the vehicle is wading by reference to one or more sensors. Sensors configured to detect wading may include liquid sensors, a camera system, a radar or ultrasonic transmitter/receiver apparatus or any other suitable means for detecting that a vehicle is wading. For the purposes of the present application, by wading is meant that the vehicle is travelling through a liquid covered surface such that at least one wheel travels through water having a depth of at least 0.3 m.

For the purposes of the present application an off-road vehicle may be defined as a road vehicle having at least some off road capability such as the provision of all wheel drive. That is, a driveline of the vehicle may be operated such that drive torque is delivered to each wheel.

The control system may be configured to cause the driveline to operate in a configuration selected at least in part in further dependence on a signal indicative of a selected driving mode in which the vehicle is operating, the driving mode being selected from a plurality of driving modes.

Optionally the signal indicative of the driving mode in which the vehicle is operating corresponds to a state of a manual driving mode selector input device or a signal indicative of a driving mode selected automatically by automatic driving mode selection means.

The control system may have a subsystem controller for initiating control of at least one vehicle subsystem in a selected one of a plurality of subsystem configuration modes of that system, the subsystem configuration mode being selected in dependence on the selected driving mode.

Optionally, the driving modes correspond to respective different driving conditions for a vehicle.

In some embodiments the driving modes correspond to different types of terrain over which a vehicle may drive. For example one driving mode may be suitable for driving over relatively soft, slippery terrain such as grass, gravel or snow and another driving mode provided for driving over sand terrain. Another driving mode may be suitable for travel over muddy or rutted terrain. A still further driving mode may be suitable for travel over rocky terrain and yet another may be suitable for travel over relatively smooth, non-slippery terrain such as on-road. For example when travelling over grass, gravel or snow terrain an engine controller may be configured to implement an accelerator pedal/engine torque map that provides a relatively gradual increase in engine torque as the accelerator pedal is depressed. In contrast, in the sand mode, a relatively rapid increase in engine torque may be experienced, at least initially, as the accelerator pedal is depressed.

Optionally, in each driving mode the system is configured to cause the at least one vehicle subsystem to be operated in a subsystem configuration mode appropriate to the driving condition.

Optionally, each driving mode has a corresponding subsystem configuration mode of at least one vehicle subsystem selected from amongst an engine management system, a transmission system, a steering system, a brakes system and a suspension system.

Optionally, the subsystem configuration modes of at least one driving mode are selected from amongst:

a subsystem configuration mode of a suspension system, the plurality of subsystem configuration modes of the suspension system comprising a plurality of ride heights;

a subsystem configuration mode of a fluid suspension system in which fluid interconnection can be made between suspensions for wheels on opposite sides of the vehicle, the plurality of subsystem configuration modes of the fluid suspension system providing different levels of said interconnection;

a subsystem configuration mode of a steering system which can provide steering assistance, the plurality of subsystem configuration modes of the steering system providing different levels of said steering assistance;

a subsystem configuration mode of a brakes system which can provide braking assistance, the plurality of subsystem configuration modes of the brakes system providing different levels of said braking assistance;

a subsystem configuration mode of a brake control system which can provide an anti-lock function to control wheel slip, the plurality of subsystem configuration modes of the brake control system allowing different levels of said wheel slip;

a subsystem configuration mode of a powertrain system which includes a powertrain control means and an accelerator or throttle pedal, the subsystem configuration modes of the powertrain system providing different levels of responsiveness of the powertrain control means to movement of the accelerator or throttle pedal;

a subsystem configuration mode of a traction control system which is arranged to control wheel spin, the plurality of subsystem configuration modes of the traction control system allowing different levels of said wheel spin;

a subsystem configuration mode of a yaw control system which is arranged to control vehicle yaw, the plurality of subsystem configuration modes of the yaw control system allowing different levels of divergence of said vehicle yaw from an expected yaw;

a subsystem configuration mode of a range change transmission, the subsystem configuration modes of the range change transmission including a high range mode and a low range mode of said transmission; and a subsystem configuration mode of a transmission system operable in a plurality of transmission ratios and including a transmission control means arranged to monitor at least one parameter of the vehicle and to select the transmission ratios in response, the subsystem configuration modes of the transmission system including a plurality of transmission configuration modes in which the transmission ratios are selected differently in response to said at least one parameter.

In one aspect of the invention for which protection is sought there is provided a driveline in combination with a system according to another aspect.

In an aspect of the invention for which protection is sought there is provided a powertrain comprising a driveline and a system according to another aspect.

In an aspect of the invention for which protection is sought there is provided a driveline and a system according to another aspect.

In a further aspect of the invention for which protection is sought there is provided a motor vehicle comprising a body, a plurality of wheels, a powertrain to drive said wheels, the powertrain comprising a driveline, a braking system to brake said wheels, and a system according to another aspect.

In one aspect of the invention for which protection is sought there is provided a method of controlling a driveline of a motor vehicle to operate in a selected one of a plurality of configurations, the method comprising:

sensing an environment ahead of the vehicle and generating a sensor signal in dependence on the environment, causing the driveline to operate in a configuration selected in dependence at least in part on the sensor signal.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying figures in which.

DETAILED DESCRIPTION

Figure 1:
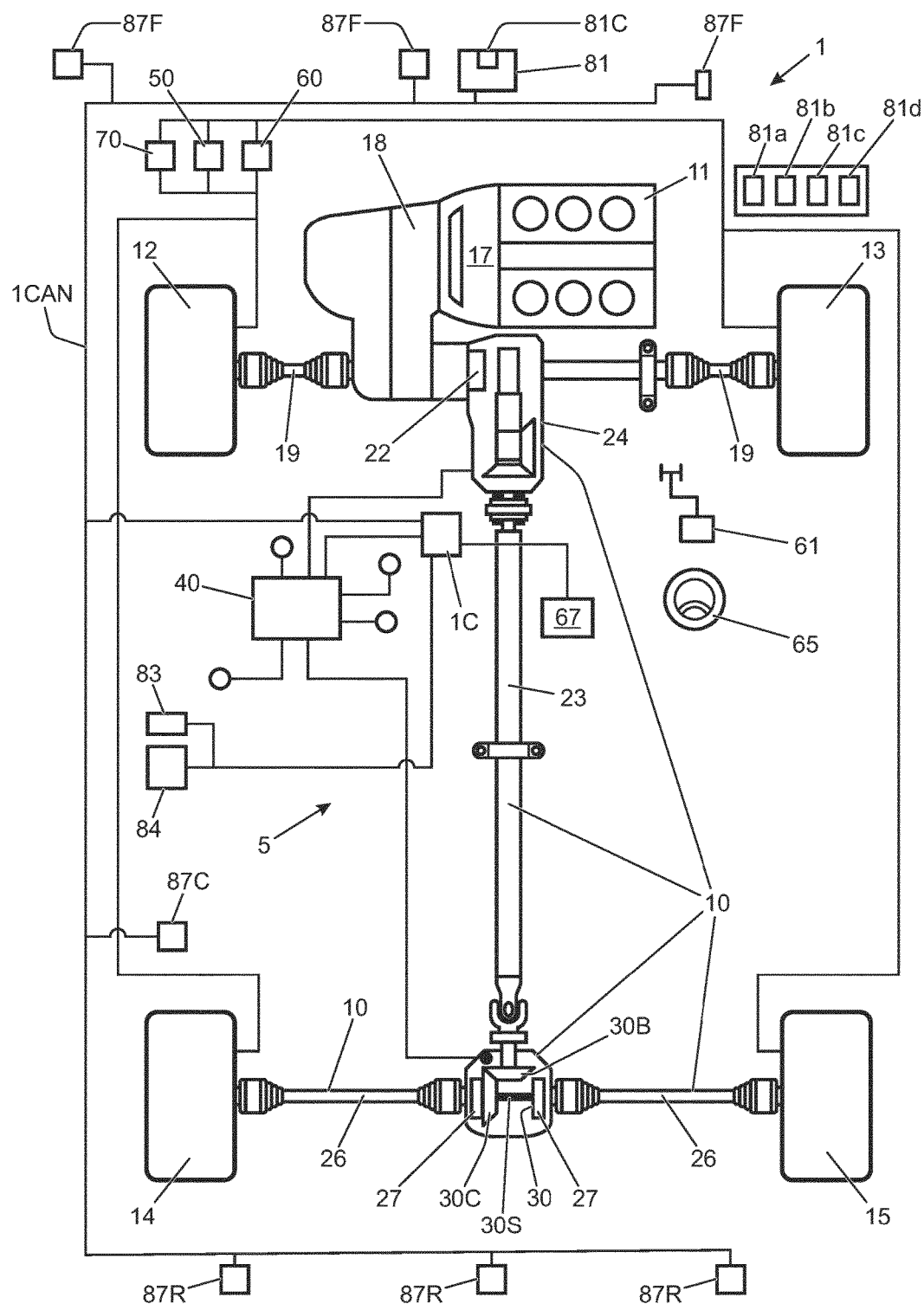
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear drive unit (RDU) 30 operable to couple the prop shaft 23 to rear drive shafts 26.

The RDU 30 has a pair of clutches 27 having input portions driven by a spool shaft 30S. The spool shaft 30S is driven by a crown gear 30C which is in turn driven by a bevel gear 30B driven by the prop shaft 23. The clutches 27 enable the RDU 30 to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller. The controller 40 may be arranged to attempt to cause the engine 11 to develop a required amount of torque and/or to rotate at a required speed in some embodiments.

In the embodiment of FIG. 1 the PTC 22 and RDU clutches 27 have respective actuators operable to close the PTC 22 and respective clutches 27 at a selected one of a plurality of different rates. This allows the transition from the two wheel drive mode of operation to the four wheel drive mode of operation to be at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the fully closed condition. In the case of a multi-plate wet clutch the maximum amount of torque the clutch can transmit may be responsive at least in part to an amount of pressure applied to the plates of the clutch.

In an alternative embodiment the RDU 30 may be provided with a conventional differential gear arrangement, but have one or more locking clutches for preventing relative rotation of output shafts of the differential arrangement when required.

For the present purposes, a driveline will be considered to be in the four wheel drive mode or configuration if the pressure applied to the plates of one or both of the clutches 27 exceeds a predetermined value. The predetermined value may be determined to be a value that will allow torque of up to a predetermined torque value to be transmitted by a clutch 27.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of a vehicle.

Recognising this, the present inventors have realised that in some circumstances it is desirable to actuate the clutches 27 of the RDU 30 and/or the PTC 22 at a reduced rate in order to reduce a rate at which the rear wheels 14, 15 and/or gearbox are connected to the prop shaft 23. This can reduce a rate of wear of components of the driveline 5 and reduce NVH associated with a transition from the first mode to the second mode.

The controller 40 of the driveline 5 is arranged to control the auxiliary driveline 10 such that slower rates of actuation of the PTC 22 and clutches 27 are employed when a requirement to assume the four wheel drive mode of operation of the driveline 5 is less urgent and higher rates of actuation are employed when the requirement to assume the four wheel drive mode is more urgent.

The vehicle 1 is provided with an antilock braking system (ABS) module 50 arranged to control a brake of one or more wheels of the vehicle to reduce an amount of braking action when required in order to prevent skidding. The vehicle 1 also has a dynamic stability control system (DSC) 60 arranged to control an amount of torque delivered to one or more wheels of the vehicle to prevent wheel slip.

Furthermore, the vehicle 1 has a traction control system (TCS) 70 arranged to monitor wheels of the vehicle 1 and to apply a brake to a wheel in the event that it is determined that the wheel is rotating at a speed that is higher than that required for substantially no wheel slip to occur.

The vehicle has a vehicle control unit (VCU) 1C that is configured to perform a number of vehicle control functions. The VCU 1C receives input signals from a number of vehicle sensor. The sensors (not shown) include sensors which provide continuous sensor outputs to the VCU 1C, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In some other embodiments, only a selection of the aforementioned sensors may be used.

The vehicle 1 is also provided with a plurality of sensors which provide discrete sensor outputs to the VCU 1C, including a transfer box or PTU status signal (indicating whether a gear ratio of the PTU 24 is set to a HI range or a LO range), a TCS signal and a DSC signal. It is to be understood that the TCS and DSC signals each provide an indication as to whether the TCS or DSC systems 70, 60 are currently intervening to control application of brake torque and/or powertrain torque to one or more wheels, as appropriate, to improve vehicle stability.

The vehicle 1 has a camera module 81 having a forward facing video camera 81C that is configured to provide a live video feed to the VCU 1C. One or more rear facing cameras may be provided in some embodiments. The vehicle 1 also has three forward radar transmit/receive modules 87F and three rear radar transmit/receive modules 87R. The forward and rear modules 87F, 87R are configured to transmit radar waves and to detect transmitted waves that are reflected by objects or terrain ahead of and behind the vehicle 1, respectively. Signals generated by the modules 87F, 87R are fed to a radio control module 87C via vehicle controller area network (CAN) bus 1CAN. The radar control module 87C is configured to process the signals received and provide an output to the VCU 1C indicative of the distance of detected objects or terrain from the vehicle and their relative direction from the vehicle 1C. It is to be understood that other numbers of forward and/or rear facing radar modules 87F, 87R may be employed in some embodiments. In some embodiments only one or more front facing modules 87F may be provided, or one or more rear facing modules 87R. It is to be understood that other communications network arrangements may be employed other than a CAN bus 1CAN such as a flexray automotive communication bus, Ethernet communication bus or any other suitable communications network arrangement.

The vehicle 1 also has a radio module 83 configured to receive a live traffic data signal from a traffic data service, and a live weather data signal from a weather data service. The module 83 processes the data and outputs the data to the VCU 1C. A location determining system in the form of a global positioning system (GPS) module 84 is also provided that is configured to determine the geographical location of the vehicle 1 by reference to GPS satellite signals. In some embodiments an alternative system for determining vehicle location may be employed such as a general packet radio service (GPRS) module. The VCU 1C is provided with navigation aid functionality. The VCU 1C is configured to allow a user to input an intended destination of the vehicle 1, in response to which the VCU 1C is configured to calculate an optimum route of travel to the intended destination and to provide navigation instructions to the user to enable the user to follow the optimum route.

The vehicle 1 has five subsystems that may be caused by the VCU 1C to operate in one of a plurality of different subsystem configuration modes in order to provide different vehicle performance characteristics such that the vehicle may be operated in a predetermined one of a plurality of different driving modes. Thus, the VCU 1C causes each of the plurality of vehicle subsystems 81a-d, 60 to operate in the subsystem configuration mode appropriate to the selected driving mode. In the present embodiment the subsystems 81a-d, 60 are an engine management system 81a, a transmission control system 81b, an electronic power assisted steering unit 81c (ePAS unit), ABS module 50 and a suspension control system 81d.

In the present embodiment, the VCU 1C is configured to operate the subsystems according to the driving mode that has been selected either manually by a user by means of a selector dial provided in a switchpack 67 accessible to the driver whilst driving, or automatically by the VCU 1C in response to signals received from various sensors on the vehicle. In the automatic mode of driving mode selection, the VCU 1C selects the driving mode according to the type of terrain in which the vehicle 1 is operating as determined by reference at least in part to the signals received from the sensors, as described in UK patent GB2492655 referred to above.

The driving modes include a grass/gravel/snow driving mode (GGS mode) that is suitable for when the vehicle is travelling in grass, gravel or snow terrain, a mud/ruts driving mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. The SP OFF mode may also be referred to as an 'on-road' or 'on-highway' driving mode. Many other driving modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

The manner in which the VCU 1C is configured to cause the subsystems 81a-d, 60 to operate in different respective driving modes is described in more detail UK patent GB2492655 referred to above.

Although five subsystems 81a-d, 60 are illustrated as being under the control of the VCU 1C, in practice a greater number of vehicle subsystems 81a-d, 60 may be included on the vehicle 1 and may be under the control of the VCU 1C. The VCU 1C includes a subsystem control module which provides control signals to each of the vehicle subsystems 81a-d, 60 to cause each subsystem 81a-d, 60 to operate in the subsystem configuration mode corresponding to the selected driving mode. Thus, each subsystem 81a-d, 60 may be caused to operate in a manner appropriate to the driving condition, such as the terrain or driving surface, in which the vehicle 1 is travelling (referred to as the terrain condition). The subsystems 81a-d, 60 also communicate with the subsystems control module of the VCU 1C to feed back information on subsystem status.

It is to be understood that in the present embodiment the controller 40 is operable to control the driveline 5 to assume the four wheel drive mode in dependence on the driving mode in which the VCU 1C is causing the vehicle 1 to operate. In the present embodiment, the controller 40 causes the driveline 5 to operate in the four wheel drive mode when the VCU 1C is operating in a driving mode other than the on-highway driving mode. When the VCU 1C is operating in the on-highway driving mode the VCU 1C causes the controller 40 to control the driveline to operate in the two wheel drive or four wheel drive mode according to an active driveline control strategy.

In the present embodiment, when operating in the on-highway driving mode the controller 40 is arranged to cause the driveline 5 to operate in the two wheel drive mode at speeds above a predetermined upper threshold speed for four wheel drive operation, v_U4WD. In the case that the driveline 5 is in the four wheel drive mode and the speed exceeds v_U4WD, the controller 40 causes the driveline 5 to assume the two wheel drive mode. This feature has the advantage that the vehicle 1 will typically consume less fuel, and may also emit a lower amount of unwanted combustion products compared with continued operation in the four wheel drive mode above v_U4WD. In the present embodiment the value of v_U4WD is set to a value of 35 kph although other values may be useful in some embodiments such as 30 kph, 40 kph or any other suitable value.

If the driveline 5 is in the two wheel drive mode and the vehicle speed falls below a predetermined lower threshold speed for four wheel drive operation, v_L4WD, the controller 40 causes the driveline 5 to switch from the two wheel drive mode to the four wheel drive mode. In the present embodiment, v_L4WD is set to a value of 12 kph although other values may be useful in some embodiments such as 10 kph, 15 kph, 20 kph, 25 kph or any other suitable value. It is to be understood that, since v_L4WD<v_U4WD, hysteresis is present in respect of the speeds at which transitions between the two and four wheel drive modes occur. This feature has the advantage that it reduces the risk of mode chattering which might otherwise occur if v_L4WD were substantially equal to v_U4WD and the vehicle speed was to oscillate between speeds above and below v_L4WD in relatively rapid succession.

Figure 2:
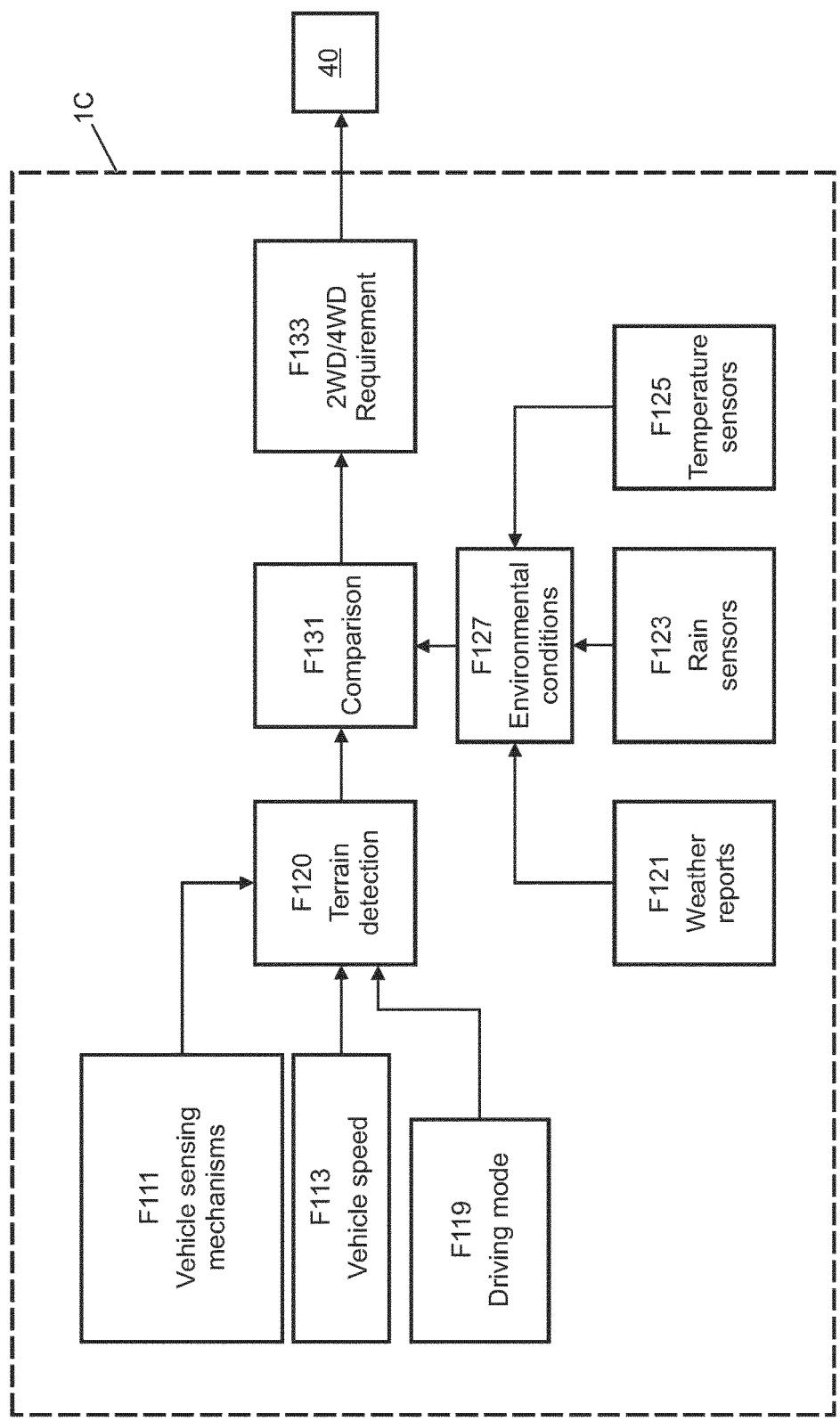
FIG. 2 is a flow diagram illustrating operation of a portion of a vehicle control system of the vehicle of FIG. 1.

FIG. 2 illustrates the manner of operation of a portion of the VCU 1C in terms of function blocks associated with operation of the VCU 1C.

Reference herein to a block such as a function block is to be understood to include reference to software code for performing the function or action specified in which an output is provided responsive to one or more inputs. The code may be in the form of a software routine or function called by a main computer program, or be code forming part of a flow of code not being a separate routine or function. Reference to function block is made for ease of explanation of the manner of operation of the VCU 1C of the present embodiment. It is to be understood that in some alternative embodiments a different arrangement of software code may be employed, such as an alternative arrangement of function blocks.

The VCU 1C also has a terrain detection function block F120 that receives data from a vehicle sensing function block F111, a vehicle speed function block F113 and a driving mode function block F119.

In the present embodiment the sensing function block F111 receives the following data:
(a) video data captured by the camera module 81C;
(b) data in respect of lateral and longitudinal acceleration generated by the ABS module 50; and
(c) data in respect of the presence of objects or terrain ahead of and behind the vehicle, generated by the radar control module 87C.

It is to be understood that in some embodiments the VCU 1C may receive data from one or more advanced driver assistance systems (ADAS). For example, the video data captured by the camera module 81C and/or data in respect of objects or terrain ahead of or behind the vehicle generated by the radar control module 87C may be received from a parking assistance system, a system arranged to alert a driver to lane departure during on-highway driving, or any other system. Similarly, data obtained via sources other than camera module 81C and radar control module 87C may be received by the VCU 1C.

The sensing function block F111 is configured to process the video data from the camera module 81C in order to detect the presence of an uphill or downhill gradient in a path of the vehicle 1 using known image analysis techniques. The sensing function block F111 outputs to terrain detection function block F120 a signal indicative of the gradient of terrain ahead of the direction of travel of the vehicle 1 in a path of travel of the vehicle. The sensing function block F111 is configured to predict the path of travel of the vehicle at least in part in dependence on a steering angle of steerable road wheels of the vehicle 1. In some embodiments steerable road wheel angle is determined by reference to a rotational position of the steering wheel 65 of the vehicle 1 although other arrangements may be useful in some embodiments.

The sensing function block F111 also receives a data signal from the radar control module 87C and employs this information to verify whether the data received from the radar control module 87C is consistent with the determination of gradient of terrain ahead of the vehicle 1 made by reference to video data from the camera module 81C.

The data in respect of lateral and longitudinal acceleration is employed by the sensing function block F111 to monitor the pitch attitude of the vehicle 1.

Vehicle speed function block F113 is configured to receive a signal corresponding to vehicle speed from the ABS module 50. The speed signal may be referred to as a reference speed signal v_ref. The function block F113 outputs the reference speed signal v_ref to the terrain detection function block F120.

Driving mode function block F119 outputs a signal to the terrain detection function block F120 indicative of the driving mode in which the vehicle 1 is currently operating. In the present embodiment the driving mode function block F119 determines the vehicle driving mode by reference to the value of a driving mode parameter stored in a memory of the VCU 1C, the driving mode parameter being indicative of the driving mode in which the vehicle is currently operating. In some alternative embodiments not having automatic driving mode selection functionality the driving mode function block F119 may determine the instant driving mode by reference to the state of the driving mode selector dial provided in switchpack 67.

The terrain detection function block F120 compares the data received from the vehicle sensing mechanisms function block F111, vehicle speed function block F113 and driving mode function block F119. The terrain detection function block F120 outputs to the comparison function block F131 a signal indicating the gradient of terrain ahead of the vehicle 1, a signal indicative of vehicle speed and a signal indicative of the driving mode, being a signal indicative of terrain type.

The VCU 1C also implements an environmental conditions function block F127. The environmental conditions function block F127 receives data signals from a weather reports function block F121, a rain sensor function block F123 and a temperature sensor function block F125.

The weather reports function block F121 processes the live weather data received by the VCU 1C from the radio module 83. The function block F121 determines based on the data the likelihood that a surface coefficient of friction between the road wheels and driving surface, surface mu, may have been compromised by precipitation, for example due to the presence of water, snow, ice or the like on the driving surface. The function block F121 then provides an output to the environmental conditions function block F127 indicative of whether surface mu is likely to have been compromised. It is to be understood that the weather reports function block F121 may, alternatively, receive weather data from another source such as a mobile telecommunications device such as a handheld telecommunications device, an in-car telecommunications device or any other suitable means. The weather reports function block F121 may for example receive weather data from a computing device such as an in-car computing system associated with an infotainment system that receives weather data from a source such as a mobile communications cellular network.

The rain sensor function block F123 receives a signal from a rain sensor module indicative of whether precipitation has been detected. A signal is then output by the rain sensor function block F123 to the environmental conditions function block F127 indicative of whether or not precipitation has been detected by the rain sensor module. In some embodiments the rain sensor function block F123 may only output the signal indicative that precipitation has been detected if the rain sensor function block F123 provides a signal indicative of the detection of precipitation for more than a predetermined period of time, such as 20 s, 30 s or 60 s, or any other suitable time period. This is in order to reduce the risk of a false determination that precipitation is occurring, for example as a result of the presence of cleaning fluid on the rain sensor as a result of washing of a windshield of the vehicle 1C whilst driving.

The temperature sensor function block F125 is configured to receive a signal from an ambient temperature sensor indicative of an outside air temperature (OAT). The temperature sensor function block F125 outputs a signal to the environmental conditions function block F127 indicative of the OAT. In some embodiments the temperature sensor function block F125 outputs a signal to the environmental conditions function block F127 only if OAT is detected to be less than a critical temperature, such as 5C. Other values of critical temperature may be useful in some embodiments.

In response to receipt of signals from function blocks F121, F123 and F125, the environmental conditions function block F127 calculates a surface wetness factor indicative of a likelihood that a driving surface is wet and outputs the factor to the comparison function block F131. It is to be understood that the surface wetness factor is arranged to be higher the higher the probability that a driving surface is wet. The environmental conditions function block F127 takes into account ambient temperature in determining the surface wetness factor. It is to be understood that the environmental conditions function block F127 may be configured to reduce the value of surface wetness factor, indicating a reduced likelihood that the driving surface is wet, following the end of a period of precipitation, the wetness factor being reduced at increasingly high rates as a function of increasing ambient temperature. For example, the environmental conditions function block F127 may be configured to reduce the surface wetness factor at a rate that increases with increasing ambient temperature, when the ambient temperature is above a threshold temperature of 5C. Other values of threshold temperature may be useful in some embodiments.

The comparison function block F131 compares the signals received from the terrain detection function block F120 and environmental conditions function block F127 and determines whether the driveline 5 should be operated in the four wheel drive configuration rather than the two wheel drive configuration. In the present embodiment this determination is made regardless of the configuration in which the driveline 5 is operating, since a transition from the four wheel drive configuration to the two wheel drive configuration might otherwise occur in response to one or more other signals received by the VCU 1C such as a speed signal as discussed above. Such a transition may be undesirable if the vehicle 1 is about to negotiate a gradient for which the four wheel drive configuration is more appropriate.

The comparison function block 131 takes into account the following in determining whether the four wheel drive configuration of the driveline 5 is more appropriate:
(a) the gradient of the expected path of the vehicle ahead of the vehicle;
(b) the surface wetness factor; and
(c) the selected driving mode.

As noted above, in the present embodiment if the vehicle 1 is operating in a driving mode other than the on-highway (SPO) driving mode the driveline 5 is caused to operate in the four wheel drive configuration. However, if the vehicle 1 is operating in the on-highway driving mode, the VCU 1 determines whether operation in the four wheel drive configuration is warranted based on factors (a) and (b) above. In the present embodiment, the comparison function block F131 is configured to cause the driveline 5 to assume the four wheel drive configuration if the estimated gradient of the path ahead of the vehicle exceeds a first gradient value when the surface wetness factor is less than a first wetness factor value, or the estimated gradient exceeds a second gradient value less than the first when the surface wetness factor is greater than the first wetness factor value. Thus, the critical gradient above which operation of the driveline 5 in the four wheel drive configuration is triggered when the probability that the surface is wet is higher.

It is to be understood that, if the surface wetness factor is less than the first wetness factor value, i.e. the likelihood that the surface is dry is relatively high, the comparison function block F131 may be configured to cause the driveline 5 to operate in the four wheel drive configuration if the surface gradient exceeds substantially a first gradient value of 5% although other values of first gradient value may be useful such as 4%, 10% or any other suitable value.

If the surface wetness factor is greater than the first wetness factor value, i.e. the likelihood that the surface is wet is relatively high, the comparison function block F131 may be configured to cause the driveline 5 to operate in the four wheel drive configuration if the surface gradient exceeds a second gradient value of substantially 3% although other values of second gradient value may be useful such as 2%, 5%, 10% or any other suitable value, provided that the second gradient value is less than the first, in some embodiments.

The comparison function block F131 then outputs a signal to a control function block F133 indicating whether the driveline 5 should be operated in the four wheel drive mode. The control function block F133 is configured to provide a signal to the driveline controller 40 indicative of the configuration in which the driveline 5 should be operated at a given moment in time.

The control function block F133 receives the signal output by the comparison function block F131. If the driveline 5 is already operating in the four wheel drive configuration, the control function block F133 outputs to the driveline controller 40 an indication that the driveline 5 should remain in the four wheel drive configuration. If the driveline 5 is operating in the two wheel drive configuration, the control function block F133 outputs an indication that the driveline 5 should assume the four wheel drive configuration for as long as the comparison function block F131 indicates that the four wheel drive configuration is more appropriate.

In some embodiments the comparison function block F131 may be configured to determine whether locking torque should be applied between two or more wheels of the driveline 5 in dependence on the gradient of the path of the vehicle 1 ahead of the vehicle 1. By locking torque is meant that an amount of relative torque that is required to be applied to two or more wheels in order to cause relative rotation may be increased thereby to reduce the amount of any relative rotation between the wheels when negotiating terrain. It is to be understood that locking torque between wheels of a given axle may be useful in preventing spin of one wheel relative to the other due to a difference in surface coefficient of friction between one wheel and a driving surface on which the wheel is resting and another wheel of the axle and a driving surface on which that wheel is resting. For example, when travelling up a relatively steep gradient on-road, spin of one driving wheel relative to another of the same axle may occur if one wheel travels over a patch of ice whilst the other wheel is travelling over relatively dry tarmac. Locking torque may be applied between wheels of a given axle, referred to as cross-axle lock, and/or between respective axles, referred to as centre-diff lock or inter-axle lock, in order to prevent or reduce wheel spin.

In some embodiments allowing locking torque to be implemented, the comparison function block F131 may be configured to cause the driveline 5 to operate in the first configuration with cross-axle lock or inter-axle lock implemented in dependence on the terrain ahead of the vehicle 1. In the present embodiment, the comparison function block F131 is configured to trigger inter-axle lock if the gradient exceeds a third threshold value that is greater than the first and second threshold values.

In some embodiments the terrain detection function block F120 may be configured to determine whether the path of the vehicle 1 ahead of the vehicle 1 is substantially straight, and the comparison function block F131 configured to provide a signal to the control function block F133 indicating that cross-axle lock should be implemented, in a driveline 5 permitting cross-axle lock to be implemented, if the gradient exceeds a predetermined value greater than the first and second values when the path of the vehicle 1 has been determined to be substantially straight. Other arrangements may be useful.

In some embodiments the predetermined gradient value may be at least 10% although smaller values may be useful in some embodiments.

In some embodiments the terrain detection function block F120 may determine whether cross-axle lock is desirable regardless of whether the path ahead of the vehicle 1 is straight. The control function block F133 may in turn allow cross-axle lock to be implemented in dependence on whether the terrain detection function block F120 determined that cross-axle lock was desirable, and an instant steering angle of the vehicle 1. Cross-axle lock may be permitted if the terrain detection function block F120 determined that cross-axle lock was desirable and the instant value of steering angle is less than a predetermined threshold value such as 5 degrees, 10 degrees or any other suitable value.

In the embodiment of FIG. 1, cross-axle locking torque may be applied between the rear wheels 14, 15 of the vehicle by closure of clutches 27 of the RDU 30. The amount of pressure causing closure of the clutches 27 may in some embodiments be increased relative to that required for normal operation in the four wheel drive configuration. It is to be understood that a certain amount of slippage of one clutch 27 relative to the other is permitted during normal four wheel drive operation in the embodiment of FIG. 1 in order to accommodate differences in wheel speed due to cornering. Accordingly, the maximum available pressure to cause closure of the clutches 27 is not employed in normal four wheel drive operation. However, in order to implement cross-axle lock, the amount of clutch closure pressure is increased relative to the value normally employed during operation in the four wheel drive configuration.

It is to be understood that some embodiments of the present invention may be used with a range of different types of driveline.

Figure 3:
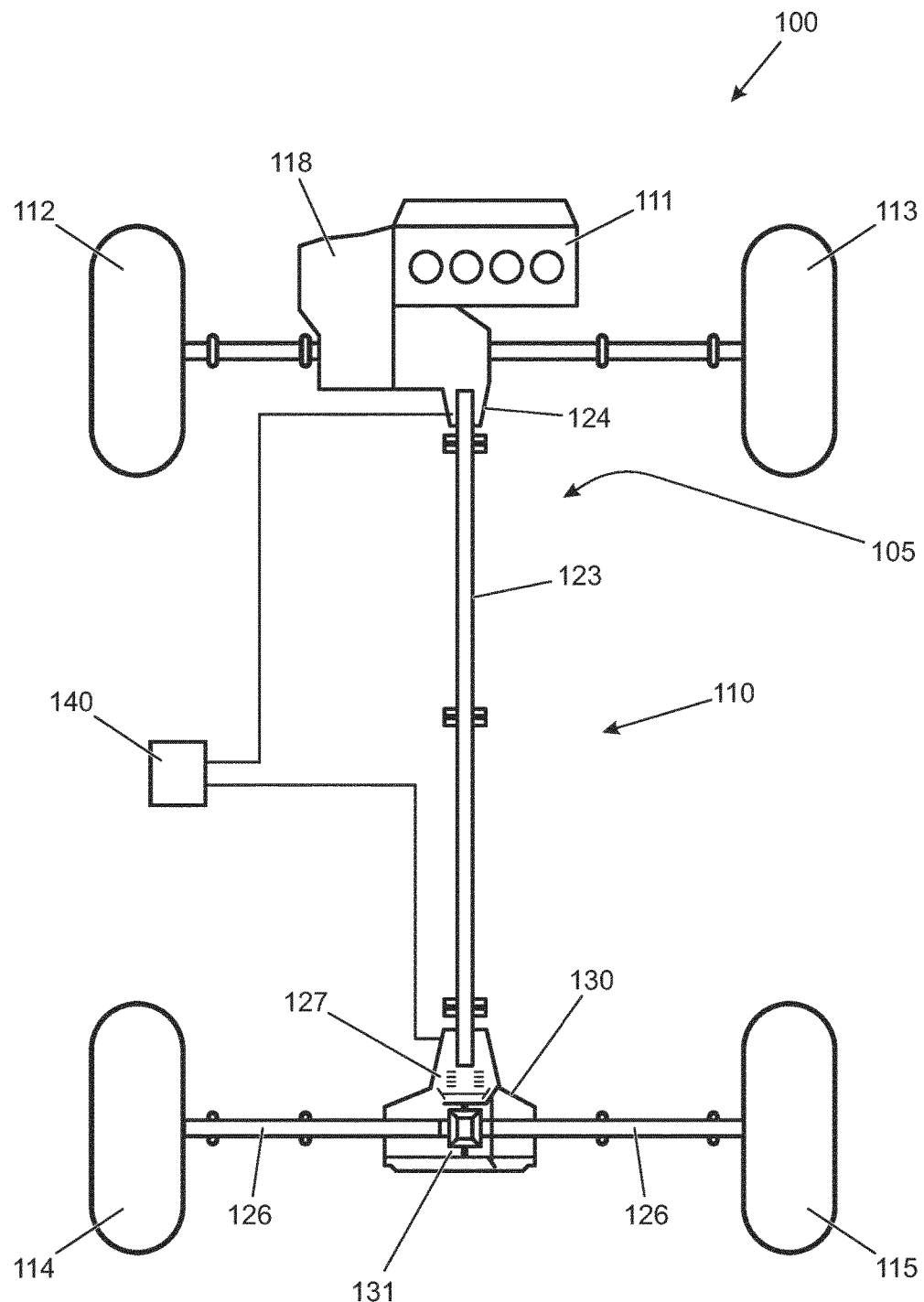
FIG. 3 is a schematic illustration of a vehicle according to a further embodiment of the present invention.

FIG. 3 illustrates a portion of a vehicle 100 according to a further embodiment of the present invention. Like features of the embodiment of FIG. 3 to those of the embodiment of FIG. 1 are shown with like reference signs incremented by 100.

The vehicle 100 has a driveline 105 having a PTU 124 having a PTC (not shown) configured to allow a prop shaft 123 to be connected to a gearbox 118. At an opposite end of the prop shaft 123, a rear drive unit 130 is provided having a clutch 127 in the form of a multi-plate wet clutch. The RDU 130 also has a differential gear arrangement 131 for driving respective left and right rear drive shafts 126. The clutch 127 is configured to connect the prop shaft 123 to an input portion of the differential gear arrangement 131. It is to be understood that the controller 140 is configured to cause the vehicle 100 to operate in the two wheel drive mode by controlling the PTU 124 to disconnect the prop shaft 123 from the gearbox 118, and controlling the clutch 127 of the RDU 130 to disconnect the prop shaft 123 from the differential 131. The controller 140 is also configured to cause the vehicle to operate in the four wheel drive mode by controlling the PTU 124 to connect the prop shaft 123 to the gearbox 118, and controlling the clutch 127 of the RDU 130 to connect the prop shaft 123 to the differential 131. In the embodiment of FIG. 3 the PTU 124 has a PTC in the form of a multi-plate wet clutch. In an alternative embodiment the PTC is in the form of a dog clutch, the PTU 124 also having a synchroniser for synchronising the speed of rotation of input and output portions of the PTC when it is required to close the dog clutch.

Figure 5:
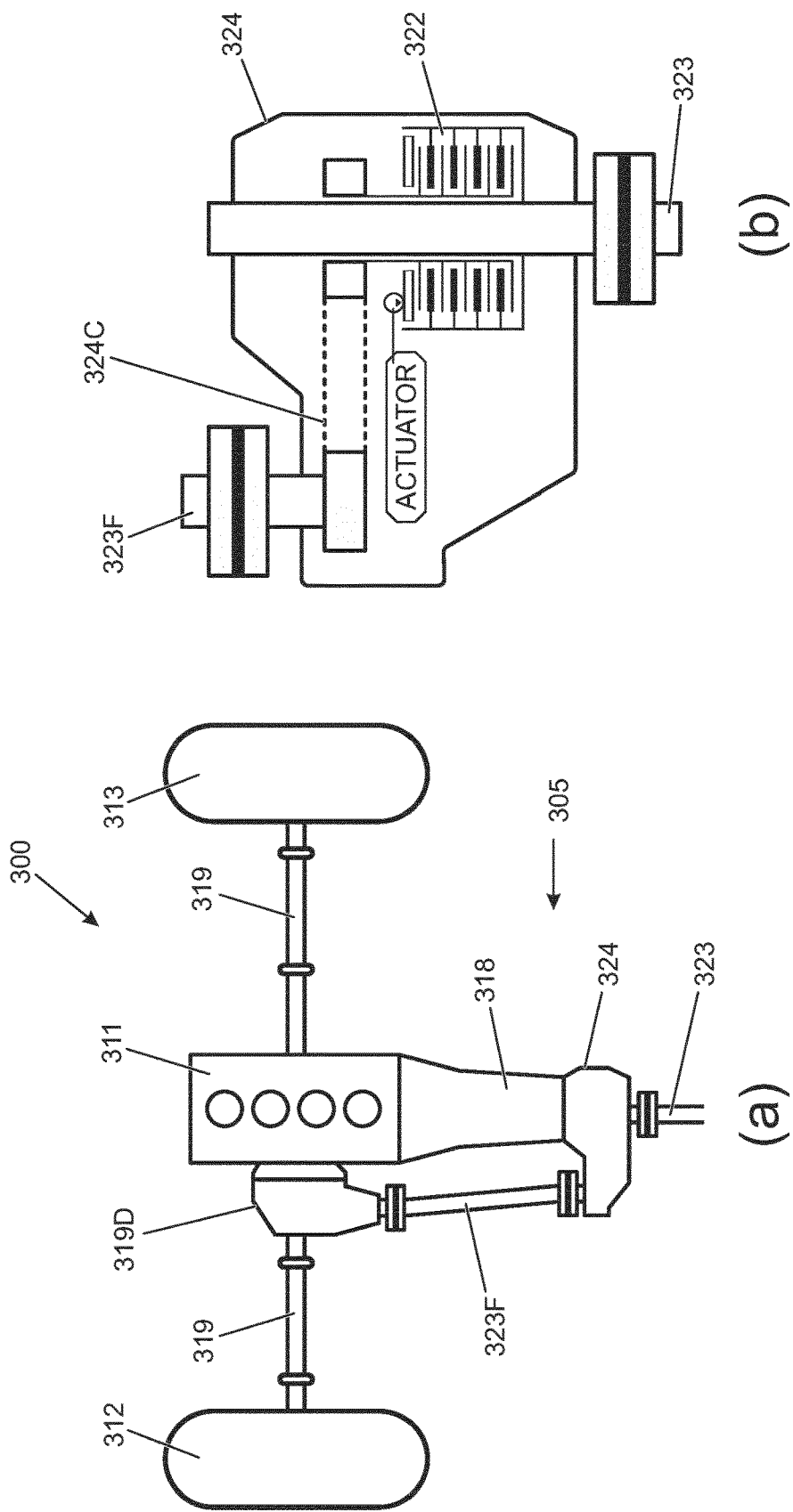
FIG. 5 is a schematic illustration of (a) a vehicle according to an embodiment of the present invention and (b) an enlarged view of a portion of the vehicle shown in (a).

The driveline 105 of the embodiment of FIG. 5 is not configured to allow cross-axle lock to be applied between rear wheels 114, 115 of the driveline 5. However in some alternative embodiments means may be provided for locking the rear drive shafts 126 together such that relative rotation may be substantially prevented. For example in some embodiments the rear drive shafts 126 may be arranged to be locked together by means of a clutch arrangement.

Figure 4:
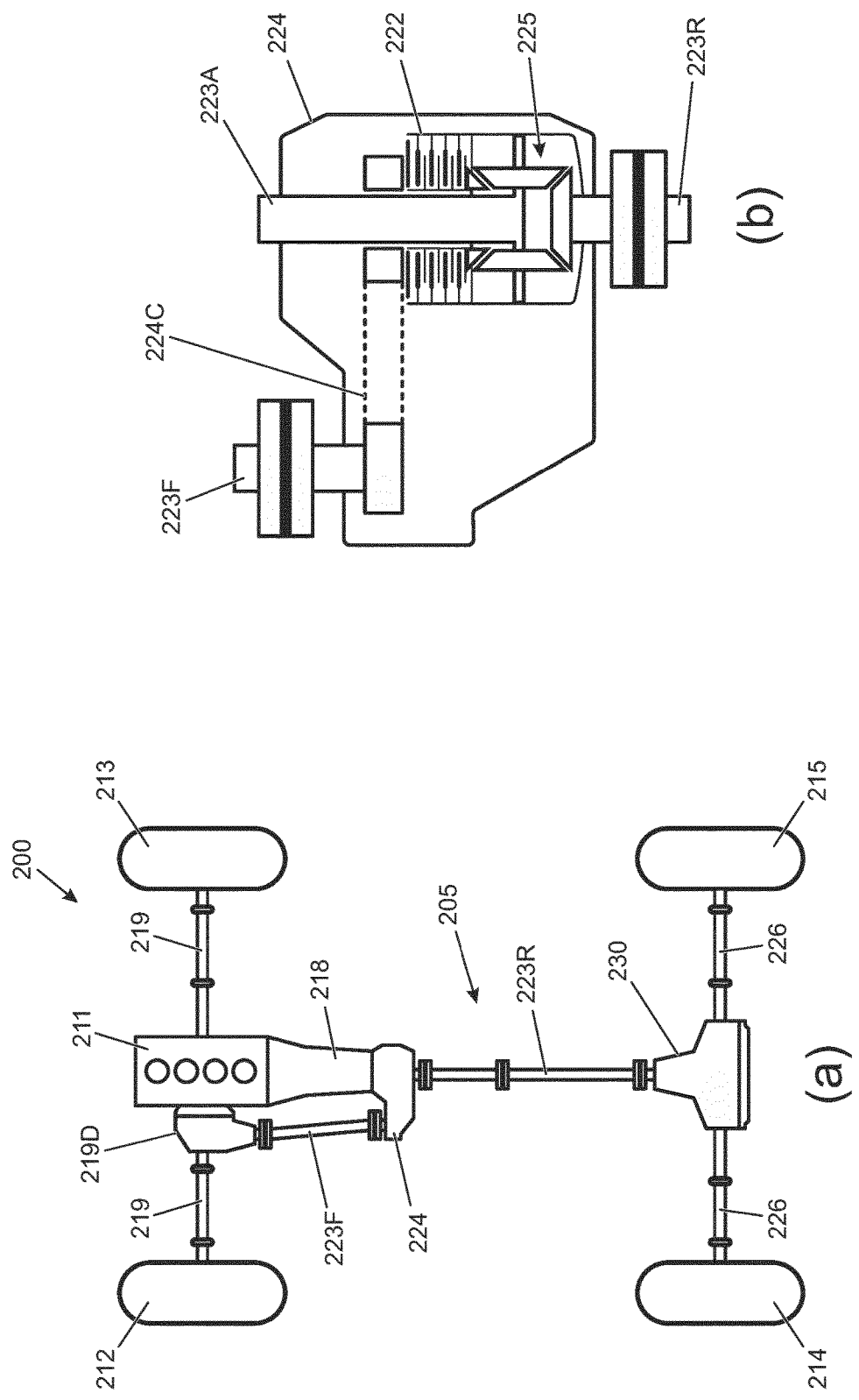
FIG. 4 is a schematic illustration of (a) a vehicle according to a still further embodiment of the present invention and (b) an enlarged view of a portion of the vehicle shown in (a)

FIG. 4(a) illustrates a portion of a vehicle 200 according to a further embodiment of the present invention. Like features of the embodiment of FIG. 4 to those of the embodiment of FIG. 1 are shown with like reference signs incremented by 200. FIG. 4(b) is an enlarged view of a portion of the driveline 205 of the vehicle 200 shown in (a) and shows detail in respect of PTU 224.

The driveline 205 has a PTU input shaft 223A (FIG. 4(b)) that is permanently connected to a gearbox 218 and a rear prop shaft 223R that is connected to the PTU input shaft 223A by means of a differential gear arrangement 225. In the embodiment shown the differential 225 may be referred to as a 'centre differential' or 'centre diff' and forms part of the PTU 224. The differential 225 allows the PTU input shaft 223A and rear prop shaft 223R to rotate at different respective speeds.

The rear prop shaft 223R is connected to an RDU 230 that is configured to allow the rear prop shaft 223R to be connected to and disconnected from rear wheels 214, 215. In the embodiment of FIG. 4 the RDU 230 is similar to RDU 130 of the embodiment of FIG. 3 although other types of RDU may be useful such as RDU 30 of the embodiment of FIG. 1.

The PTU 224 has a PTC 222 that allows PTU input shaft 223A to be releasably connected to a front prop shaft 223F via a chain drive 224C. The PTC 222 is a multi-plate wet clutch in the embodiment of FIG. 4 although other types of clutch 222 may be useful in some embodiments such as a dog clutch. The front prop shaft 223F is in turn arranged to drive a pair of front drive shafts 219 via a front differential unit 219D. The front differential unit 219D has a differential gear arrangement that allows the prop shafts 219 to rotate at different respective speeds.

In some embodiments the PTU 224 may be provided without the differential 225. FIG. 5 shows a portion of a driveline 305 having such a PTU. Like features of the embodiment of FIG. 5 to those of the embodiment of FIG. 1 are shown with like reference signs incremented by 300.

In the arrangement of FIG. 5, a single prop shaft 323 connects gearbox 318 and an RDU (not shown). That is, the driveline 305 does not have a separate PTU input shaft and rear prop shaft. A PTC 322 in the form of a multi-plate wet clutch 322 is provided that is configured to allow the prop shaft 323 to be connected to a front prop shaft 323F that is arranged in turn to drive a front differential unit 319D. The PTC 322 is arranged to drive the front prop shaft 323F via a chain drive 324C.

Some embodiments of the invention may be understood with reference to the following numbered paragraphs:

1. A control system configured to control a driveline of a motor vehicle to operate in a selected one of a plurality of configurations,
the system comprising at least one sensor for sensing an environment ahead of the vehicle and generating a sensor signal in dependence on the environment,
the system being configured to cause the driveline to operate in a configuration selected in dependence at least in part on the sensor signal.

2. A control system according to paragraph 1 configured to cause the driveline to operate in a first configuration in which the driveline is configured such that a first group of one or more wheels and in addition a second group of one or more wheels are arranged to be driven or a second configuration in which the first group of one or more wheels and not the second group are arranged to be driven.

3. A control system according to paragraph 2 wherein the driveline is configured to assume the first or second configuration in dependence at least in part on the sensor signal.

4. A control system according to paragraph 2 wherein the first or second group of one or more wheels comprises a plurality of wheels, the driveline being operable in a configuration in which a predetermined amount of locking torque is established between at least a pair of wheels of the plurality of wheels of the first or second group in dependence at least in part on the sensor signal.

5. A control system according to paragraph 4 configured to set a predetermined amount of locking torque between at least one wheel of the first group and at least one wheel of the second group in dependence at least in part on the sensor signal.

6. A control system according to paragraph 1 configured to estimate a gradient of a driving surface in dependence on the at least one sensor signal, the system being configured to cause the driveline to operate in a configuration selected in dependence at least in part on the estimated gradient.

7. A control system according to paragraph 1 configured to cause the driveline to operate in a configuration selected in further dependence at least in part on at least one characteristic of a driving surface.

8. A control system according to paragraph 7 configured to determine the at least one characteristic at least in part by reference to one selected from amongst a signal generated by a rain sensor, a signal indicative that the vehicle is wading, and data received by the system from a weather data service.

9. A control system according to paragraph 1 configured to cause the driveline to operate in a configuration selected at least in part in further dependence on a signal indicative of a selected driving mode in which the vehicle is operating, the driving mode being selected from a plurality of driving modes.

10. A control system according to paragraph 9 wherein the signal indicative of the driving mode in which the vehicle is operating corresponds to a state of a manual driving mode selector input device or a signal indicative of a driving mode selected automatically by an automatic driving mode selector.

11. A control system according paragraph 9 having a subsystem controller for initiating control of at least one vehicle subsystem in a selected one of a plurality of subsystem configuration modes of that system, the subsystem configuration mode being selected in dependence on the selected driving mode.

12. A control system according to paragraph 11 wherein the driving modes correspond to respective different driving conditions for a vehicle.

13. A control system according to paragraph 12 wherein in each driving mode the system is configured to cause the at least one vehicle subsystem to be operated in a subsystem configuration mode appropriate to the driving condition.

14. A control system according to paragraph 9 wherein each driving mode has a corresponding subsystem configuration mode of at least one vehicle subsystem selected from amongst an engine management system, a transmission system, a steering system, a brakes system and a suspension system.

15. A control system according to paragraph 9 wherein the subsystem configuration modes of at least one driving mode are selected from amongst:
a subsystem configuration mode of a suspension system, the plurality of subsystem configuration modes of the suspension system comprising a plurality of ride heights;
a subsystem configuration mode of a fluid suspension system in which fluid interconnection can be made between suspensions for wheels on opposite sides of the vehicle, the plurality of subsystem configuration modes of the fluid suspension system providing different levels of said interconnection;
a subsystem configuration mode of a steering system which can provide steering assistance, the plurality of subsystem configuration modes of the steering system providing different levels of said steering assistance;
a subsystem configuration mode of a brakes system which can provide braking assistance, the plurality of subsystem configuration modes of the brakes system providing different levels of said braking assistance;
a subsystem configuration mode of a brake control system which can provide an anti-lock function to control wheel slip, the plurality of subsystem configuration modes of the brake control system allowing different levels of said wheel slip;
a subsystem configuration mode of a powertrain system which includes a powertrain controller and an accelerator or throttle pedal, the subsystem configuration modes of the powertrain system providing different levels of responsiveness of the powertrain controller to movement of the accelerator or throttle pedal;
a subsystem configuration mode of a traction control system which is arranged to control wheel spin, the plurality of subsystem configuration modes of the traction control system allowing different levels of said wheel spin;
a subsystem configuration mode of a yaw control system which is arranged to control vehicle yaw, the plurality of subsystem configuration modes of the yaw control system allowing different levels of divergence of said vehicle yaw from an expected yaw;
a subsystem configuration mode of a range change transmission, the subsystem configuration modes of the range change transmission including a high range mode and a low range mode of said transmission; and a subsystem configuration mode of a transmission system operable in a plurality of transmission ratios and including a transmission controller arranged to monitor at least one parameter of the vehicle and to select the transmission ratios in response, the subsystem configuration modes of the transmission system including a plurality of transmission configuration modes in which the transmission ratios are selected differently in response to said at least one parameter.

16. A driveline in combination with a system according to paragraph 1.

17. A powertrain comprising a driveline and a system according to paragraph 1.

18. A motor vehicle comprising a driveline and a system according to paragraph 1.

19. A motor vehicle comprising a body, a plurality of wheels, a powertrain to drive said wheels, the powertrain comprising a driveline, a braking system to brake said wheels, and a system according to paragraph 1.

20. A method of controlling a driveline of a motor vehicle to operate in a selected one of a plurality of configurations, the method comprising:

sensing an environment ahead of the vehicle and generating a sensor signal in dependence on the environment, causing the driveline to operate in a configuration selected in dependence at least in part on the sensor signal.

21. A carrier medium carrying computer readable code for controlling a vehicle to carry out the method of paragraph 20.

22. A computer program product executable on a processor so as to implement the method of paragraph 20.

23. A computer readable medium loaded with the computer program product of paragraph 20.

24. A processor arranged to implement the method of paragraph 28, or the computer program product of paragraph 22.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system configured to control a driveline of a motor vehicle to operate in a selected one of a plurality of configurations, the system comprising:

at least one sensor for sensing an environment ahead of the vehicle and generating a sensor signal in dependence on the environment ahead;

a controller configured to cause the driveline to operate in a first configuration in which the driveline is configured such that a first group of one or more wheels and in addition a second group of one or more wheels are arranged to be driven or a second configuration in which the first group of one or more wheels and not the second group of one or more wheels are arranged to be driven wherein the driveline is caused to operate in the first configuration or the second configuration in dependence, at least in part, on the sensor signal, wherein the first group of wheels comprises a plurality of wheels or the second group of wheels comprises a plurality of wheels, the controller being configured to calculate a predetermined amount of locking torque between at least one pair of wheels of the plurality of wheels of the first group or at least one pair of wheels of the plurality of wheels of the second group in dependence at least in part on the sensor signal and configured to cause the driveline to establish the predetermined amount of locking torque between the at least one pair of wheels of the plurality of wheels of the first group or at least one pair of wheels of the plurality of wheels of the second group.

2. The control system according to claim 1, wherein the control system is configured to set a predetermined amount of locking torque between at least one wheel of the first group and at least one wheel of the second group in dependence at least in part on the sensor signal.

3. The control system according to claim 1, wherein the control system is configured to estimate a gradient of a driving surface in dependence on the at least one sensor signal, the control system being configured to cause the driveline to operate in a configuration selected in dependence at least in part on the estimated gradient.

4. The control system according to claim 1, wherein the control system is configured to cause the driveline to operate in a configuration selected in further dependence at least in part on at least one characteristic of a driving surface.

5. The control system according to claim 4, wherein the control system is configured to determine the at least one characteristic of the driving surface at least in part by reference to a characteristic selected from amongst a signal generated by a rain sensor, a signal indicative that the vehicle is wading, and data received by the control system from a weather data service.

6. The control system according to claim 1, wherein the at least one sensor senses the type of terrain comprising the environment ahead of the vehicle and the sensor signal indicates the type of terrain.

7. The control system according to claim 6, wherein the type of terrain sensed comprises one of grass, gravel, snow, sand, mud or rocky terrain.

8. The control system according to claim 1, wherein the control system is configured to cause the driveline to operate in a configuration selected at least in part in further dependence on a signal indicative of a selected driving mode in which the vehicle is operating, the selected driving mode being selected from a plurality of driving modes.

9. The control system according to claim 8, wherein the signal indicative of the selected driving mode in which the vehicle is operating corresponds to a state of a manual driving mode selector input device or a signal indicative of a driving mode selected automatically by automatic driving mode selection means.

10. The control system according claim 8, having a subsystem controller for initiating control of at least one vehicle subsystem in a selected one of a plurality of subsystem configuration modes of that vehicle subsystem, the selected one of the plurality of subsystem configuration mode being selected in dependence on the selected driving modes.

11. The control system according to claim 10, wherein the plurality of driving modes correspond to respective different driving conditions for the vehicle.

12. The control system according to claim 11, wherein in each of the plurality of driving modes the control system is configured to cause, the at least one vehicle subsystem to be operated in a subsystem configuration mode appropriate to the respective driving condition.

13. The control system according to claim 8, wherein each of the plurality of driving modes has a corresponding subsystem configuration mode of at least one vehicle subsystem selected from amongst an engine management system, a transmission system, a steering system, a brakes system and a suspension system.

14. The control system according to claim 8, wherein a subsystem configuration mode of at least one of the plurality of driving modes is selected from amongst:
   a plurality of subsystem configuration modes of a suspension system, wherein the plurality of subsystem configuration modes of the suspension system comprises a plurality of ride heights;
   a plurality of subsystem configuration modes of a fluid suspension system in which fluid interconnection can be made between suspensions for wheels on opposite sides of the vehicle, the plurality of subsystem configuration modes of the fluid suspension system providing different levels of said interconnection;
   a plurality of subsystem configuration modes of a steering system which can provide steering assistance, the plurality of subsystem configuration modes of the steering system providing different levels of said steering assistance;
   a plurality of subsystem configuration modes of a brakes system which can provide braking assistance, the plurality of subsystem configuration modes of the brakes system providing different levels of said braking assistance;
   a plurality of subsystem configuration modes of a brake control system which can provide an anti-lock function to control wheel slip, the plurality of subsystem configuration modes of the brake control system allowing different levels of said wheel slip;
   a plurality of subsystem configuration modes of a powertrain system which includes a powertrain control means and an accelerator or throttle pedal, the plurality of subsystem configuration modes of the powertrain system providing different levels of responsiveness of the powertrain control means to movement of the accelerator or throttle pedal;
   a plurality of subsystem configuration modes of a traction control system which is arranged to control wheel spin, the plurality of subsystem configuration modes of the traction control system allowing different levels of said wheel spin;
   a plurality of subsystem configuration modes of a yaw control system which is arranged to control vehicle yaw, the plurality of subsystem configuration modes of the yaw control system allowing different levels of divergence of said vehicle yaw from an expected yaw;
   a plurality of subsystem configuration modes of a range change transmission, the plurality of subsystem configuration modes of the range change transmission including a high range mode and a low range mode of said transmission; and
   a plurality of subsystem configuration modes of a transmission system operable in a plurality of transmission ratios and including a transmission control means arranged to monitor at least one parameter of the vehicle and to select the transmission ratios in response, the plurality of subsystem configuration modes of the transmission system including a plurality of transmission configuration modes in which the transmission ratios are selected differently in response to said at least one parameter.

15. The driveline in combination with the control system of claim 1.

16. A powertrain comprising the driveline and the control system of claim 1.

17. The motor vehicle comprising the driveline and the control system of claim 1.

18. The motor vehicle comprising a body, the plurality of wheels, a powertrain to drive said plurality of wheels, the powertrain comprising the driveline, a braking system to brake said plurality of wheels, and the control system of claim 1.

19. A method of controlling a driveline of a motor vehicle to operate in a selected one of a plurality of configurations, the method comprising:
   sensing an environment ahead of the vehicle and generating a sensor signal in dependence on the environment ahead;
   causing the driveline to operate in a first configuration in which the driveline is configured such that a first group of one or more wheels and in addition a second group of one or more wheels are arranged to be driven or a second configuration in which the first group of one or more wheels and not the second group of one or more wheels are arranged to be driven, wherein the driveline is caused to operate in the first configuration or second configuration in dependence, at least in part, on the sensor signal, wherein the first group of wheels comprises a plurality of wheels or the second group of wheels comprises a plurality of wheels; calculating a predetermined amount of locking torque between at least a pair of wheels of the plurality of wheels of the first group or a pair of wheels of the plurality of wheels of the second group in dependence at least in part on the sensor signal; and
   causing the driveline to establish the predetermined amount of locking torque between the at least a pair of wheels of the plurality of wheels of the first group or the at least a pair of wheels of the plurality of wheels of the second group.

20. A non-transitory storage medium containing a computer program executable on a processor so as to implement the method of claim 19.

* * * * *